Jan. 10, 1961   G. A. LYON   2,967,736
WHEEL COVER
Filed June 15, 1955
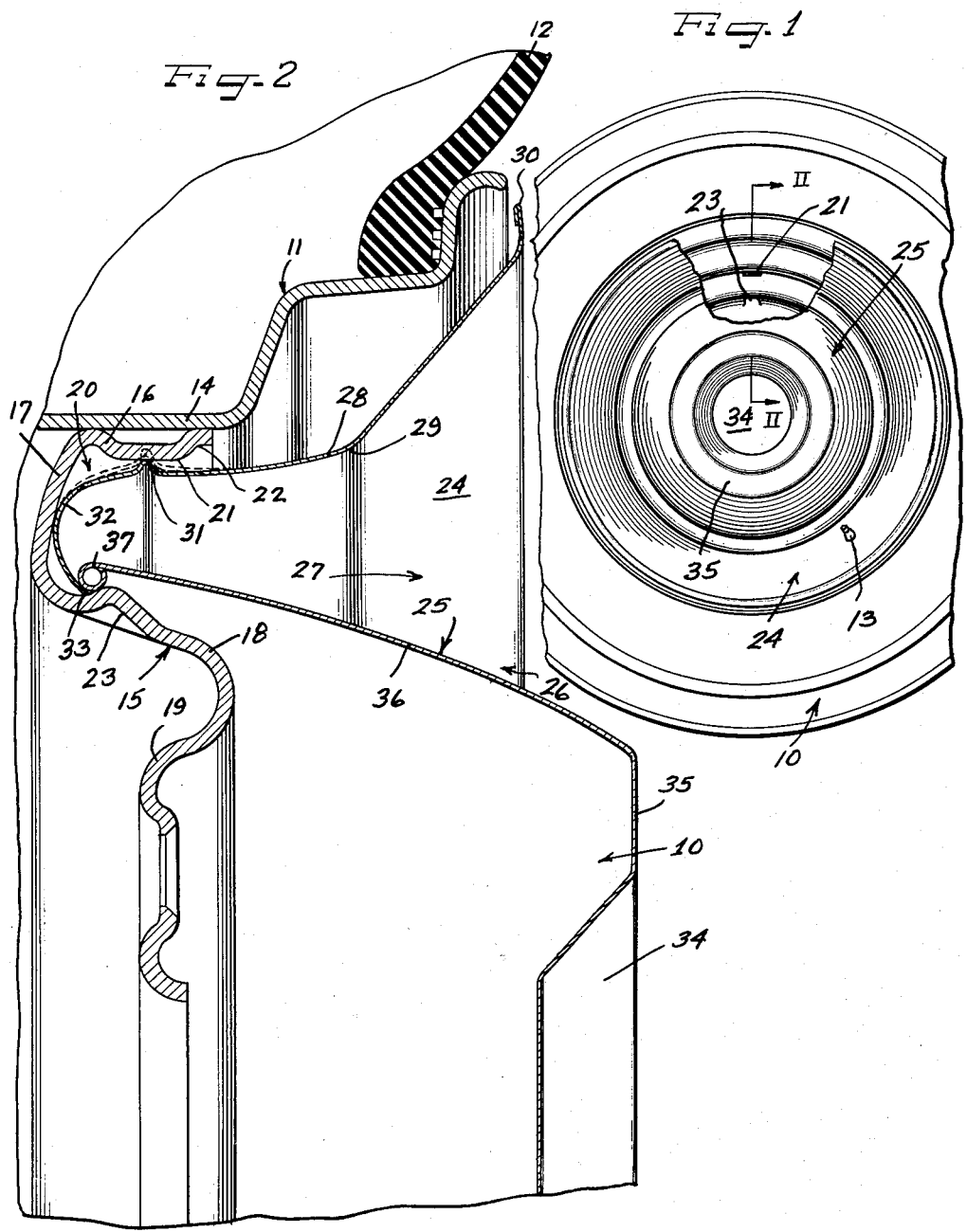
Inventor
GEORGE ALBERT LYON United States Patent Office 2,967,736
Patented Jan. 10, 1961

2,967,736

WHEEL COVER

George Albert Lyon, 13881 W. Chicago Blvd., Detroit 28, Mich.

Filed June 15, 1955, Ser. No. 515,716

10 Claims. (Cl. 301—37)

The present invention relates to improvements in wheel structures and more particularly concerns the ornamental and protective covering of the outer sides of vehicle wheels.

In the automobile industry at the present time, there appears to be developing a demand for cover structures having an unusually deeply inset draw area on the cover. As a consequence of this demand, new cover designs are being developed which, of course, require some form of retaining means so that they may be installed on a vehicle wheel.

Accordingly, it is an object of this invention to provide cover retaining means which are capable of retaining a cover having the aforementioned deeply drawn appearance on the wheel.

It will be appreciated that, in view of the present demand for deep drawn highly ornamental cover, such a structure more readily lends itself in manufacture to being made in two parts as opposed to one.

It is, therefore, another object of the invention to provide a novel two-part cover construction.

A further object of this invention is to provide an improved cover construction for vehicle wheels in which the cover may have a fairly massive appearance while, at the same time, being of as light a weight as is possible.

Other objects, features and advantages of the present invention will be more readily apparent from the following detailed description taken in conjunction with the accompanying drawing, illustrating a single embodiment thereof, in which:

Figure 1 is a fragmentary outer side elevational view of the vehicle wheel embodying features of the invention; and Figure 2 is an enlarged fragmentary cross-sectional view taken substantially on the line II—II of Figure 1.

As shown on the drawings:

The reference numeral 10 indicates generally my novel cover construction which is adapted to be mounted on the outer side of a vehicle wheel.

The instant wheel includes as component parts thereof an outer stepped tire rim flange 11 which is capable of carrying a tubeless tire 12 or the like having a valve stem 13 extending through one of the rim flanges in order to facilitate inflation of same. The tire rim 11 includes an axially extending base flange 14 which may be secured in any suitable fashion to a wheel body or spider 15. It will be noted that the instant spider 15 is of a particular construction and, accordingly, embodies features of the present invention.

The spider 15 includes a generally axially inwardly extending attachment or base flange 16 which is connected at its inner end to annular generally radially inwardly extending flange 17. Secured to the radially inner end of the flange 17 is a generally axially outwardly and radially inwardly extending flange 18 which then merges with the bolt-on portion 19 of the spider 15.

The flanges or side and bottom wall portions 16, 17 and 18 define together an annular relatively deep axial recess or recessed area 20 of sufficient radial dimension in order to be capable of receiving a corresponding deeply axially inset portion of a cover.

The flange 16 has pressed out thereof a plurality of circumferentially spaced relatively flat shoulders 21 and include a lead-in or camming surface 22.

Provided on the flange 18 are a plurality of circumferentially spaced bumps 23 which are pressed radially outwardly from the flange 18.

The purpose and function of the aforementioned shoulders 21 and bumps 23 will become evident from the later discussion herein contained.

The cover 10 includes an outer cover member 24 and an inner cover member 25, which components are especially adapted to cooperate with the aforementioned shoulders 21 and bumps 23 to retain the cover 10 on the wheel.

The outer cover member is a composite article and includes a diverging portion 26 comprised of a generally radially and axially outwardly extending outer annular flange 27 and a generally axially inwardly extending annular inner flange 28 which are joined together by a reinforcing rib 29. The outer flange 27 is adapted to conceal and overlie the rim and terminate in a pry-off bead 30. The inner flange 28 is axially elongated, is adapted to extend into the recess 20 and has pressed radially outwardly thereof a continuous annular finger-like extension or projection 31 which, in assembly, bears upon the flat shoulder 21.

The terminal and 32 of the outer cover member 24 is of an arcuate looped or bowed relatively resilient construction and is adapted to bottom in cushioned engagement against the bottom of the recessed area or the body flange 17 when in assembly with the wheel. The terminal 32 includes a gripping extremity or edge which normally projects radially inwardly and axially outwardly and is adapted in assembly to snap behind the bump 23.

The inner cover member 25 includes a relatively large rigid crown 34, a radially extending reinforcing rib 35 which merges into a deeply axially inwardly radially outwardly extending annular flange 36 which is adapted to project into the deep axial recess 20. Provided on the axially inner end thereof is an annular beaded extremity 37. By reason of the fact that the extremity is normally of a slightly smaller diameter than the body flange 18, when the bead is flexed over the bumps 23 in assembly, tensioned engagement is thereby effected.

The assembly of the cover 10 may be carried out by initially aligning the annular flange 28 of the cover member 24 with the recess 20 and thereafter engaging the projection 31 against the lead-in surface 22. An axially inward force is then applied and the finger 31 is deflected onto the flat shoulder 21 with the terminal 32 being progressively bottomed against body flange 17. As this bottoming is effected, the edge 33 is carried over the bumps 23 and engaged in tensioned relationship behind the bumps 23. In so doing, a three-point cushioned contact is effected between the cover member 27 and the retaining surfaces defining the recess. The cushioning feature resides in the fact that there is some margin for axial resilient movement by the finger 31 inwardly along the flat shoulder 21 responsive to heavy impact forces.

The outer cover member may then be aligned with the wheel and the annular bead 37 flexed and engaged behind the bumps 23. It is in this manner that the bead 37 serves to further augment the tensioned exerted upon the extremity 33 by urging the same axially inwardly along the increasing diameter of the bumps.

To effect the removal of the cover a suitable pry-off tool may be utilized to remove the inner cover member 25. Thereafter, a screwdriver or the like may be utilized to remove the outer cover member 24 by inserting the same under the bead 30 against the rim 11 and thereafter urging the outer cover member 24 out of engagement.

I claim as my invention:

1. In a wheel structure including rim and body parts with the body part having an axially inset recess to accommodate an inset cover construction and having a camming bulged surface and a retaining shoulder in opposed relation in the recess, a cover including inner and outer cover members, one of said cover members including a relatively deeply axially inset annular side wall having a projection to be cammingly bottomed on said bulged surface and a resilient extremity capable of being tensioned and engaged behind the retaining shoulder, said other cover member including an axially inwardly extending annular wall having a second extremity capable of snap-on, pry-off engagement with the retaining shoulder.

2. In a wheel structure including rim and body parts with the body part having an axially inset recess to accommodate an inset cover construction and having a camming bulged surface and a retaining shoulder in opposed relation in the recess, a cover including inner and outer cover members, one of said cover members including a relatively deeply axially inset annular side wall having a projection to be cammingly bottomed on said bulged surface and a resilient extremity capable of being tensioned and engaged behind the retaining shoulder, said other cover member including an axially inwardly extending annular wall having a second extremity capable of snap-on, pry-off engagement with the retaining shoulder, said finger and extremity being formed integral with the outer cover.

3. In a wheel structure including rim and body parts with the body part having an axially inset recess to accommodate an inset cover construction and having a camming bulged surface and a retaining shoulder in opposed relation in the recess, a cover including inner and outer cover members, one of said cover members including a relatively deeply axially inset annular side wall having a projection to be cammingly bottomed on said bulged surface and a resilient extremity capable of being tensioned and engaged behind the retaining shoulder, said other cover member including an axially inwardly extending annular wall having a second extremity capable of snap-on, pry-off engagement with the retaining shoulder, said axially inset annular side walls being in radially spaced relationship and defining together a deeply axially inset draw.

4. In a wheel structure including rim and body parts with the body part having an axially inset recess to accommodate an inset cover construction and having a camming bulged surface and a retaining shoulder in opposed relation in the recess, a cover including inner and outer cover members, one of said cover members including a relatively deeply axially inset annular side wall having a projection to be cammingly bottomed on said bulged surface and a resilient extremity capable of being tensioned and engaged behind the retaining shoulder, said other cover member including an axially inwardly extending annular wall having a second extremity capable of snap-on, pry-off engagement with the retaining shoulder, said second extremity when engaged with said retaining shoulder also serving to augment the tensioned engagement between the outer cover member and the wheel.

5. In a wheel structure including rim and body parts with the body part being axially inset and having a camming surface on the radially outer side thereof and a retaining shoulder on the radially inner side thereof, an outer cover member including a relatively deeply axially inset annular side wall having a projection to be cammingly engaged with the camming surface and a resilient extremity capable of snap-on, pry-off engagement behind the retaining shoulder, and an inner cover member including an axially inwardly extending annular wall having a second extremity capable of snap-on pry-off engagement with said retaining shoulder.

6. In a wheel structure, a wheel having rim and body parts with one of the parts having shoulder means, a cover assembly for overlying retained engagement upon the wheel including inner and outer cover members, one of said cover members having a cover portion to resiliently cam and engage with the wheel, said one of said cover members having a curled margin in cushioned bottomed engagement with the wheel and terminating in an edge engageable behind said shoulder means, the other of said cover members having a marginal cover portion for detachable engagement with said shoulder means to maintain said curled margin bottomed against the wheel, said cover portion comprising an annular rib axially slidable in camming engagement with the wheel.

7. In a wheel structure including rim and body parts with the body part having an axially extending base flange at the junction of the parts and with the body part having a deeply axially inset recessed area defining a recess which recessed area is partially defined by the base flange and is provided with cover retaining means, a cover including inner and outer cover members having marginal portions extending into the recess radially opposite the base flange, the marginal portion of one of said members being in resiliently yieldable cushioned detachable retaining engagement in the recess with the base flange and with the cover retaining means, and the other of said members also being in detachable assembly with the cover retaining means and further being engaged against the other cover member to back-up the tensioned engagement of the other cover member with the recessed area and to thereby provide means to resist accidental disengagement of the cover member from assembly with the recessed area.

8. In a wheel structure, a wheel including rim and body parts with the wheel having an axially extending base flange at the junction of the parts and with the body part having a deeply axially inset recessed area defining a recess which recessed area is partially defined by the base flange and is provided with cover retaining means, a cover including inner and outer cover members having marginal portions extending into the recess radially opposite the base flange, one of said members being in resiliently yieldable cushioned detachable retaining engagement in the recess with the cover retaining means and the other of said members also being in detachable assembly with the cover retaining means, said one of said members being in three point cushioned engagement with the recessed area with one of the points of engagement being behind the cover retaining means with another of the points of engagement being at the bottom of the recessed area and with still another of the points of engagement being with the base flange.

9. In a wheel structure, a wheel having rim and body parts with the body part having an axially extending base flange at the junction of the parts and with the body part having shoulder means radially opposite the base flange, a cover assembly for overlying retained engagement upon the wheel including inner and outer cover members having marginal portions disposed radially opposite the base flange, one of said marginal portions provided with projection means in resilient camming engagement with the body part at a point radially spaced from the shoulder means, the other of said cover members having its marginal cover portion in detachable engagement with said shoulder means to maintain itself upon the wheel and bearing against said one of said marginal portions to back-up the camming engagement between said projection means and the body part.

10. In a wheel structure, a wheel having rim and body parts with the wheel having an axially extending base flange and with the body part having a recessed area in the vicinity of the base flange, the recessed area having shoulder means radially adjacent the base flange, a cover assembly for overlying retained engagement upon the wheel including inner and outer cover members, one of said cover members having a cover portion to resiliently cam and engage with a side wall portion of the recessed area of the wheel, said one of said cover members also having a curled margin connected to the cover portion in cushioned bottomed engagement with a bottom wall portion of the recessed area of the body part, said curled margin terminating in an edge engageable behind said shoulder means, the other of said cover members having a marginal cover portion in detachable engagement with said shoulder means in removable assembly therewith and cooperable with said curled margin to resist accidental disassembly of said one of said cover members from the wheel.

References Cited in the file of this patent
UNITED STATES PATENTS

| | | |
|---|---|---|
| 2,214,746 | Lyon | Sept. 17, 1940 |
| 2,544,703 | Lyon | Mar. 13, 1951 |
| 2,600,412 | Lyon | June 17, 1952 |